July 7, 1936.  P. I. CHANDEYSSON  2,046,673
SYSTEM OF POWER TRANSMISSION
Filed July 25, 1932   2 Sheets-Sheet 1
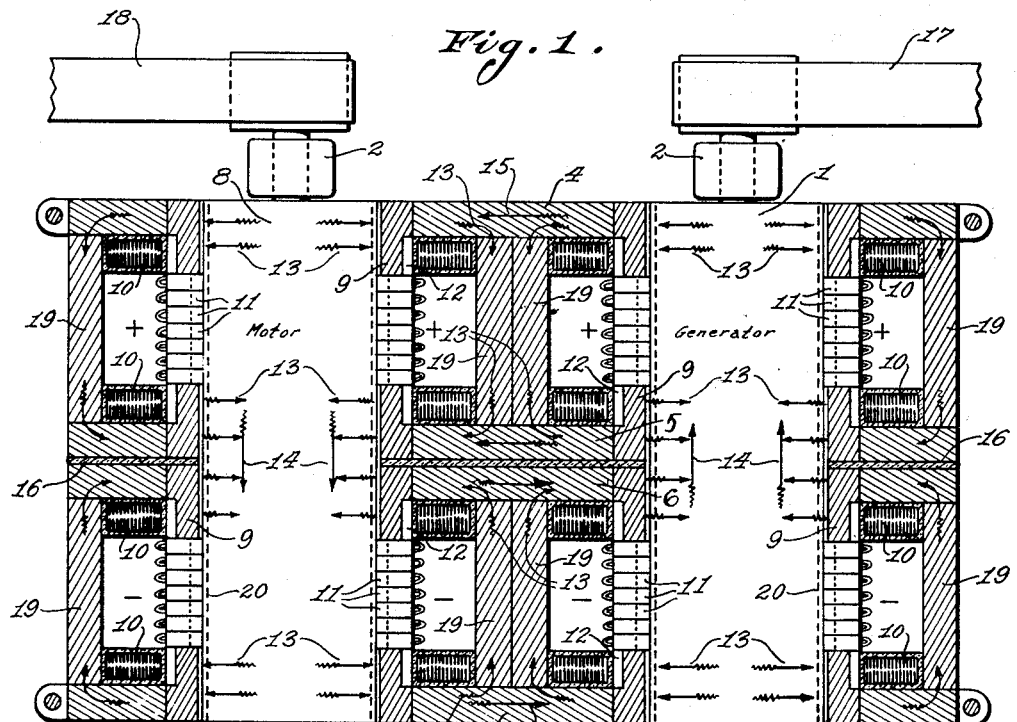
Fig. 1.
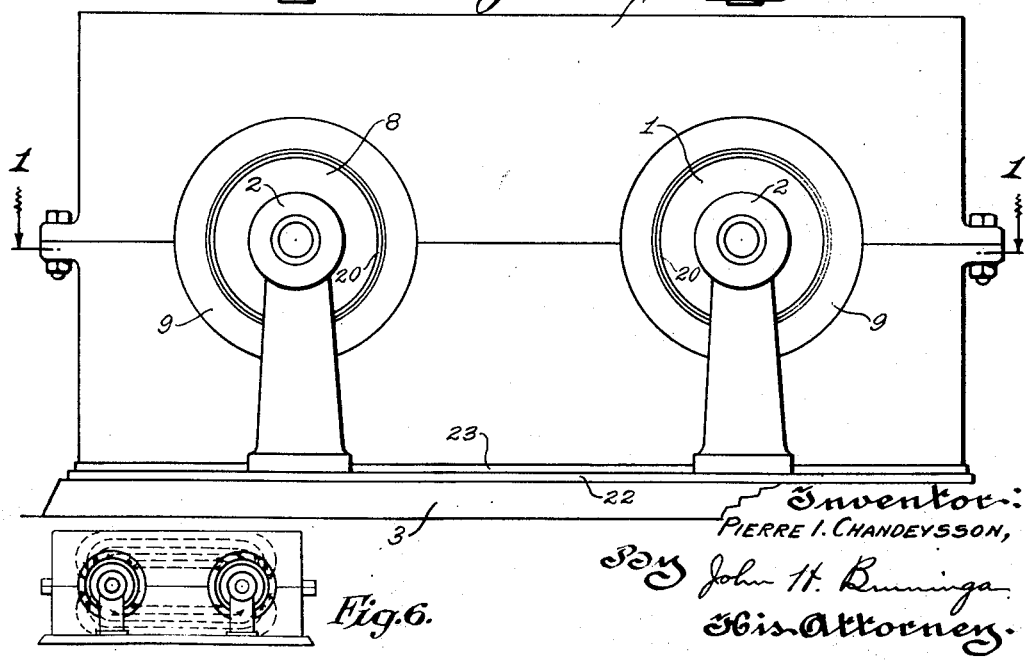
Fig. 2.
Fig. 6.
Inventor:
PIERRE I. CHANDEYSSON,
By John H. Bruninga
His Attorney.

July 7, 1936.  P. I. CHANDEYSSON  2,046,673
SYSTEM OF POWER TRANSMISSION
Filed July 25, 1932    2 Sheets-Sheet 2

Inventor:
PIERRE I. CHANDEYSSON,
By John H. Bruninga
His Attorney.

Patented July 7, 1936

2,046,673

UNITED STATES PATENT OFFICE 2,046,673

SYSTEM OF POWER TRANSMISSION

Pierre I. Chandeysson, St. Louis, Mo.

Application July 25, 1932, Serial No. 624,384

10 Claims. (Cl. 172—239)

This invention pertains to a system of power transmission involving the use of dynamo electric machines.

There are certain types of power transmission systems in which power generated electrically must be delivered as mechanical power to a machine or load unit and in which the nature of the load is such as to impose special conditions on the transmission system as a whole. Among these may be mentioned the drive of rolling mills for rolling steel in which a very heavy load must be accelerated quickly and quickly reversed; elevator drives which involve starting, stopping and reversing, as well as quick acceleration of a heavy load; electric traction in which similar conditions obtain; the electric propulsion of ships in which power generated by non-electrical means must be delivered electrically as mechanical power to the propeller shaft and in which considerable flexibility is required.

All of these types of transmission have been handled heretofore. The usual installation, except in ship propulsion, is to receive power from an electric generating station at a fairly high voltage which is supplied to a main driving motor. This motor drives a generator which may have mounted on its shaft a fly wheel or a similar device for taking up fluctuations in speed. This generator drives a motor which is connected to the load unit.

In these installations, the motors and generators universally used are of the type operating at a fairly high voltage, that is of the order of one hundred to several hundred volts, and constructed with coil windings on the rotor and stator adjusted to the voltage used. Such machines are expensive to manufacture and subject to numerous troubles in operation.

One of the objects of this invention is to simplify such a system of power transmission and the dynamo electric machines involved in its use. The homopolar type of generator has long been known, but on account of its unfavorable characteristics it has not been put to practical use. The characteristic of the homopolar generator which has been considered most undesirable and which has been a source of great difficulty in reducing it to practical use is the fact that it normally operates at an extremely low voltage so that enormous currents are involved in the transmission of any considerable amount of power by this type of machine. The activities of designers and improvers of the homopolar machine have been directed toward means for increasing the operating voltage. Such means when designed for voltages sufficiently high to reduce the power currents to usable values tend to become more complicated than the construction of higher voltage machines of the multipolar type. Accordingly, the homopolar machine has heretofore been considered inadequate for the transmission of any considerable amount of power.

Another object of this invention, therefore, is to provide a practical system of power transmission involving the use of homopolar dynamo electric machines.

Another object is to provide such a system in which homopolar machines of the simplest construction can be used.

Another object is to provide such a system in which homopolar machines may be used to deliver mechanical power to the load unit to be driven.

Further objects will appear from the following description taken in connection with the accompanying drawings, in which:

Figure 1 is a horizontal sectional view of a homopolar dynamo electric machine embodying this invention and adapted for use in the system thereof, taken on line 1—1 of Figure 2;

Figure 2 is an end view of the machine of Figure 1;

Figure 6 is a view similar to Figure 2, but to a reduced scale, illustrating a modified distribution of magnetic flux in the frame.

Figure 3:
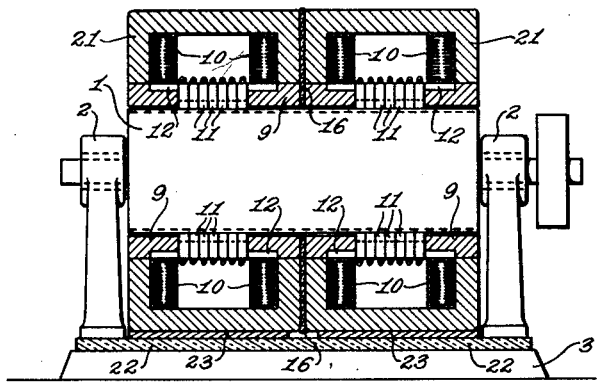
Figure 3 is a vertical sectional view of a modified type of a homopolar machine adapted for use in accordance with this invention.

In accordance with this invention, a system of transmission is provided using a main driving motor which may be of a high voltage, that is, several thousand volts and which may be arranged to receive its power from a transmission line of corresponding voltage. This motor is arranged to drive a homopolar generator which in turn drives a homopolar motor. This latter motor is connected to the load unit to be driven. In accordance with this invention homopolar machines of the simplest type are used. The voltage at which these machines operate may be extremely low, that is, from a fraction of a volt up. Arrangements are provided whereby the heavy currents involved may be transmitted in a simple and direct manner so that excessive losses in the transmission of these heavy currents are avoided.

Referring now to Figures 1 and 2 which represent a motor generator unit, 1 designates the generator rotor. This may be simply a cylinder of steel or other material preferably magnetic material. In order to reduce its resistance to electric currents this cylinder may be provided with an outside coating 20 of copper or a similar material of high conductivity. This coating may be applied to the cylinder by plating the copper thereon or by any other suitable process. The rotor 1 may be provided with a suitable shaft running in bearings 2 supported in any suitable manner on a frame or support 3.

The rotor 1 operates in a magnetic circuit including frame or core members 4, 5, 6 and 7. These core members may be simply rectangular blocks or slabs of magnetic material such as iron extending between the rotor 1 and a similar rotor 8, providing a motor unit. The core members are each provided with a pair of circular openings adapted to receive the rotors 1 and 8. These core members may further be provided with pole shoe rings 9 adapted to distribute the magnetic flux over the air gap between them and the rotor. Mounted on the rings 9 and so as to encircle the rotors are field exciting coils 10. Magnetic yoke members 19 extend between the core members 4 and 5 and the members 6 and 7 as shown in Figure 1. These yoke members carry the magnetic flux between the core members and serve to provide separate paths for the motor and generator fluxes.

A plurality of current collecting brushes 11 is arranged to bear on the surface of each of the rotors 1 and 8 near each end thereof as illustrated in Figure 1. These brushes may be supported by and electrically connected to a series of conductor bars 12 which in turn are supported by and electrically connected to the rings 9. Any suitable means for maintaining the brushes 11 in contact with the surface of the rotor may be provided. Each bank of brushes may extend entirely around the rotor periphery.

It will be noted from Figure 1 that with the exciting coils properly arranged and connected, the field flux will traverse the magnetic circuits including the rotors, as indicated by the arrows 13. The arrangement is such and the direction of rotation so arranged that the polarity of the brushes 11 will be as indicated by the plus and minus signs in Figure 1. Under these conditions current will traverse the rotors in the directions indicate by the arrows 14. These currents are led to and from the rotors by the brushes 11 which are connected to the rings 9 and, therefore, to the magnetic circuits formed by the frame or core members 4, 5, 6 and 7. With the polarity as indicated and the rotor 1 acting as a generator these currents will pass to the motor as indicated by the arrows 15. The core elements 5 and 6 are insulated from one another by an insulating plate 16.

It will be seen that this arrangement forms a motor generator set of the very simplest construction. The rotor 1 may be driven by any suitable means such as a belt 17 from any suitable source of power (not shown). Such rotation will, when the field is excited, generate currents as indicated by the arrows 14 which will pass to the rotor 8 along the core elements as indicated by the arrows 15. When the motor field coils are excited, such currents will cause the rotor 8 to rotate. This rotor may be connected to the load unit (not shown) by any suitable means such as a belt 18. The speed of rotation of the rotor 8 may be controlled by varying the voltage generated by the rotor 1, the field excitation of the motor unit being maintained constant or by any other suitable means.

It will be noted that this construction is such that the material of the magnetic circuit may be used as a conductor or conductors to carry the heavy power currents from the generator to the motor and return. As these core elements may be quite massive, they provide a large current carrying capacity so that in most cases separate conductors for transmitting the current from generator to motor will be unnecessary. Where, however, very large power currents are to be transmitted, the carrying capacity of the core elements may be re-enforced by an adjacent copper conductor extending between the frames of the two units. The use of such re-enforcing conductors will also serve to stiffen the voltage regulation of the machine.

The arrangement of the frame is such that a modified distribution of flux may be had under certain circumstances. If the direction of rotation of one of the rotors is reversed while the polarity is maintained the same, a distribution of flux, such as indicated in Figure 6, may be obtained. Supposing, for example, that this illustrates the condition of flux in the frame member 5, assuming that the direction of rotation of the generator has been reversed but the polarity is the same, in such a case the direction of the field in the generator must be reversed. This means that the flux enters the rotor at the ends and leaves at the center portion. If the excitation of both machines is substantially the same, the same amount of flux will enter the rotor of the motor as leaves the rotor of the generator. Accordingly, the flux may pass directly from the generator to the motor along the members 4, 5, 6 and 7 in the manner indicated in Figure 6. In such a case the members 19 will be inactive and it would be possible to operate without them in the manner set forth in detail in applicant's Patent No. 1,915,153, the application for which was copending with the present application.

It is not intended to claim herein the broad structure of the machine as a single-unit machine, such features being claimed in the above-mentioned Patent No. 1,915,153. The present invention relates to the motor-generator arrangement and to the system in which it is used.

Figure 4:
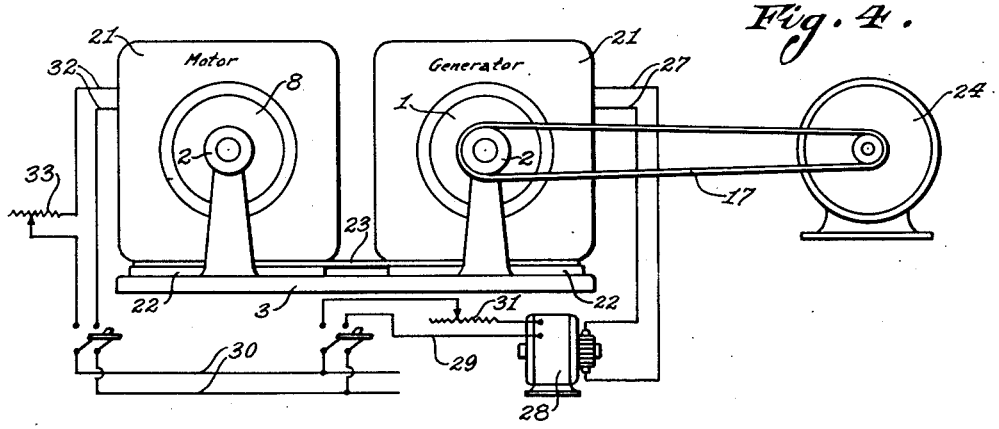
Figure 4 is a view partly diagrammatic illustrating a system of transmission embodying this invention.
Figure 5:
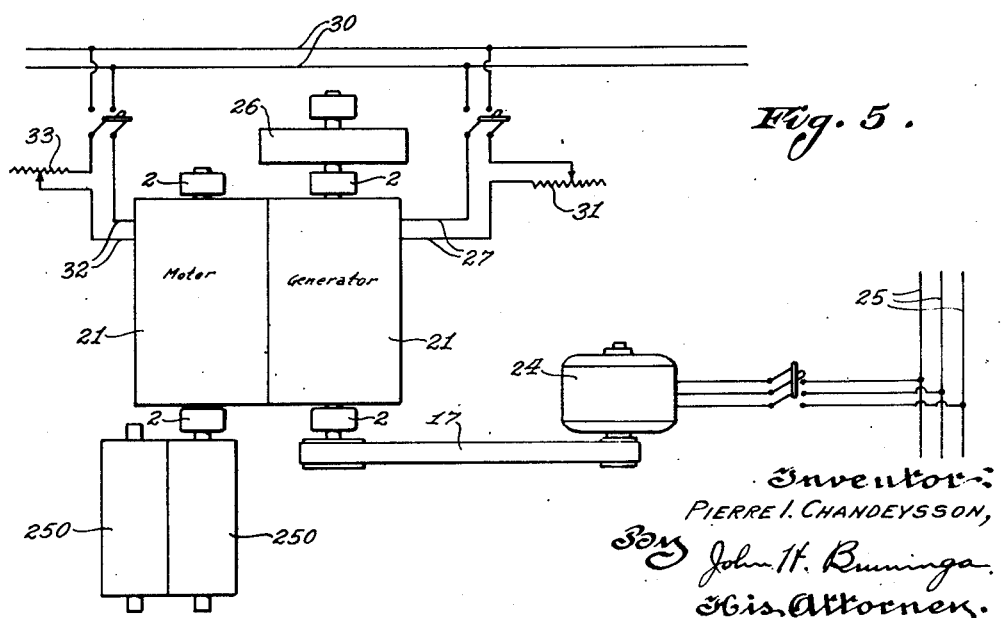
Figure 5 is a similar diagrammatic view illustrating a modified system, also embodying this invention.

Referring now to Figures 3, 4 and 5, Figure 3 shows a longitudinal section of a single-rotor dynamo electric unit similar to that described in applicant's Patent No. 1,922,028, issued August 15, 1933. Considering this as the generator unit corresponding to Figure 1, the rotor 1 is surrounded by a field structure 21, which may be of a casting or other suitable construction as described in the above mentioned application. This structure is made in two parts, separated by an insulating plate 16, similar in all respects to the plate 16 of Figure 1. Also the pole shoes 9, brushes 11 and exciting coils 10 are similarly arranged. The voltage is generated in a manner similar to that described for Figure 1 and as the brushes are connected through the pole shoes 9 to the field structures 21, these field structures form the terminals of the machine for leading the current in or out.

Figure 4 shows an end view of two units such as shown in Figure 3, mounted together on a base 3 but insulated therefrom by an insulating pad 22 in each case. Electrical connections between the machine are provided by conducting plates 23 of copper or other suitable conducting material placed between the pads 22 and the machine frames so that the machines may rest thereon. The plates 23 may be connected to the structures 21 in any suitable manner so as to provide a good electrical connection. In case of very heavy currents, additional plates 23 may be placed on top of the machine frames and connected thereto so as to provide additional current capacity.

The generator rotor 1 may be connected by a belt 17 or otherwise to a driving motor 24. The motor 24 may be of any well known type. In the case of large units this motor is preferably a high voltage motor, that is one wound for operation at several thousand volts and connected in any suitable manner to a supply circuit 25 of corresponding voltage. The rotor 8 of the motor unit may be connected to the load to be driven. In Figure 5 such load is represented by rolls 250. If desired the generator unit may be equipped with a flywheel 26 on its shaft to take up fluctuations in speed.

The exciting coils of the generator unit may be brought out to leads 27 which may be connected to any suitable exciting circuit. In Figure 4 the leads 27 are shown connected to an excitor 28, driven in any suitable manner (not shown) and whose field circuit 29 may be connected to any suitable supply 30 through a regulation device 31. The motor exciting coils have their ends brought out to leads 32 which may also be connected to a suitable exciting circuit such as 30 and may or may not be provided with a regulation device 33. In Figure 5, the field circuit of the generator is shown connected directly to the exciting circuit 30.

It will be seen that in accordance with this invention practical use is made of the homopolar type of dynamo electric machine in a novel manner. The structure of the machine itself is greatly simplified and the arrangement is such that deterioration is practically negligible. The brushes bearing on the rotor of each machine are arranged in a continuous bank extending clear around the periphery thereof. Accordingly a very great current capacity is provided and the actual current density at the brush contacts may be kept low. Accordingly the brush wear may be reduced practically to zero.

By placing the two units immediately adjacent one another and providing short heavy current connections between the two the tremendous currents involved may be handled without excessive current density and at a reasonable cost. By using the magnetic circuits of the two units to carry these currents great savings in the cost of copper may be realized.

The arrangement of the entire system is such that the over all efficiency may be very high. The high voltage transmission to a high voltage driving motor reduces the long distance transmission losses to a minimum. The use of homopolar machines of the very simplest type to provide the flexible link between the motor 24 and the load 250 effects a great simplicity in the total apparatus and a great uniformity in operation in addition to the saving in the cost of operation consequent upon the use of the very simplest type of machine which may be so designed that troubles are practically eliminated.

It will be noted that in the present invention both the motor and the generator are operated at what may be termed the elementary voltage of a homopolar machine. By this term, as used in this specification and the appended claims, is meant the voltage generated by the movement of a single elementary conductor in the magnetic field provided, and at the speed of the generating elements of the rotor. In other words, this would be the voltage generated in an imaginary single filar conductor lying upon the periphery of the rotor. This distinguishes from such operation of so-called homopolar machines wherein a number of conductors are arranged on the rotor and connected in series so that their elementary voltages are added together. Such machines operate at the total accumulated voltage. It will further be noted that in accordance with this invention the advantages of operation at the simple elementary voltage of the homopolar machine are combined directly with the advantages of power transmission at high voltages. The high voltage power is received at the high voltage driving motor and is stepped down in a single step in passing from this motor to the generator, from the high supply voltage to the elementary voltage of the generator. By this arrangement all of the power losses involved in intermediary voltage reducing appliance are eliminated.

It will be noted that this invention makes use of the homopolar machine in what may be termed its elementary simplicity. By this is meant that the machine is operated at the voltage generated by a single element of its rotor periphery considered as a conductor moving in the magnetic field. Accordingly a rotor is used whose peripheral portion is circumferentially continuous as distinguished from a construction in which a plurality of separate conductors is provided which are insulated from one another. As previously suggested attempts made heretofore to make practical use of the homopolar machine have been directed toward increasing its generated voltage by multiplying its elementary voltage by means of a plurality of conductors. This invention avoids the complication involved in such structures and, therefore, attains a great simplicity of construction and on the whole a very rugged machine which is not subject to troubles in operation.

It will further be noted that this invention lends itself to easy application of power drive in certain cases where considerable difficulty has been experienced by prior constructions. For instance, in electric traction, and particularly in the application of electric motors to locomotives, such application can be made in accordance with the present invention by simply enlarging the locomotive axle somewhat and using it as the rotor of a homopolar motor of the type described. The simplicity and ruggedness of such a construction is easily appreciated. Again in applying the invention to the propulsion of ships, the rotor of the homopolar motor may be a part of the propeller shaft itself. In this case the simplicity and ruggedness of this part of the drive is of the highest importance as it affects the reliability of the propusion of the ship.

While the system has been described as a unitary whole, it will be understood that certain individual features or sub-combinations may be useful by themselves without reference to the rest of the combination. It is understood that the employment of such individual features and sub-combinations is contemplated by this invention and within the scope of the appended claims. It is further obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. In a power system of the character described; a motor adapted for connection to the load and having, a frame providing a magnetic circuit, a rotor movable in said circuit and provided with a current-generating body having a circumferentially continuous peripheral portion adapted to carry the power-developing currents, said frame being spaced from said rotor to clear an annular portion thereof, and brushes arranged in said cleared space around the periphery of and bearing on said rotor to carry such currents thereto and therefrom; a generator having, a frame providing a magnetic circuit, a rotor movable in said circuit and provided with a current-generating body having a circumferentially continuous peripheral portion adapted to carry the power-developing currents, said frame being spaced from said rotor to clear an annular portion thereof, and brushes arranged in said cleared space around the periphery of and bearing on said rotor to carry such currents thereto and therefrom; and conducting means permanently connecting the brushes of said motor and said generator whereby the power-developing currents may be circulated therebetween.

2. In a power system of the character described, a dynamo-electric machine comprising, a frame providing a magnetic circuit, a plurality of rotors movable in said circuit, each of said rotors being provided with a current-generating body having a circumferentially continuous peripheral portion adapted to carry the power-developing currents, said frame being formed to provide an annular clear space about a portion of each of said rotors, brushes arranged in said clear space around the periphery of and bearing on each of said rotors to carry such currents thereto and therefrom, one of said rotors being adapted to be driven as a generator, and connections between said brushes adapted to carry current from said generator rotor to another rotor to drive the latter as a motor.

3. In a power system of the character described, a dynamo-electric machine comprising, a frame providing a magnetic circuit, a plurality of rotors movable in said circuit, each of said rotors being provided with a current-generating body having a circumferentially continuous peripheral portion adapted to carry the power-developing currents, said frame being formed to provide an annular clear space about a portion of each of said rotors, brushes arranged in said clear space around the periphery of and bearing on each of said rotors to carry such currents thereto and therefrom, one of said rotors being adapted to be driven as a generator, and connections between said brushes including a part of said frame adapted to carry current from said generator rotor to another rotor to drive the latter as a motor.

4. In a power system of the character described, a dynamo-electric machine, comprising, a magnetic circuit, a plurality of rotors movable in said circuit, each of said rotors being provided with a current generating body having a circumferentially continuous peripheral portion adapted to carry the power-developing currents, brushes bearing on said peripheral portion of each of said rotors adapted to carry such currents thereto and therefrom, one of said rotors being driven as a generator, and permanent current-carrying connections between said brushes on different rotors.

5. In a power system of the character described, a dynamo-electric machine, comprising, a frame including a magnetic circuit, a plurality of rotors movable in said circuit, each of said rotors being provided with a current generating body having a circumferentially continuous peripheral portion adapted to carry the power-developing currents, brushes bearing on said peripheral portion of each of said rotors adapted to carry such currents thereto and therefrom, one of said rotors being driven as a generator, and permanent current-carrying connections between said brushes on different rotors, including a portion of said frame.

6. In a power system of the character described, a dynamo-electric machine, comprising, a frame including a magnetic circuit, a plurality of rotors movable in said circuit, each of said rotors being provided with a current generating body having a circumferentially continuous peripheral portion adapted to carry the power-developing currents, and brushes mounted in electrical contact with said frame and bearing on said peripheral portion of each of said rotors adapted to carry such currents thereto and therefrom, one of said rotors being driven as a generator, and said frame providing permanent current-carrying connections between said brushes on different rotors.

7. A dynamo-electric machine, comprising, a pair of laterally adjacent frame structures each having two rotor-receiving openings, the openings of different frames being alined with each other, a pair of rotors each occupying a pair of alined openings in different frames, said frames providing magnetic circuits for said rotors, and current-collecting means bearing on said rotors and supported on said frames.

8. A dynamo-electric machine, comprising, a pair of laterally adjacent frame structures each having two rotor-receiving openings, the openings of different frames being alined with each other, a pair of rotors each occupying a pair of alined openings in different frames, said frames providing magnetic and electric circuits for said rotors, and current-collecting means bearing on said rotors and supported on said frames.

9. A dynamo-electric machine, comprising, a pair of laterally adjacent frame structures each having two rotor-receiving openings, the openings of different frames being alined with each other, a pair of rotors each occupying a pair of alined openings in different frames, one of said rotors providing integrally therewith a driving shaft, said frames providing magnetic and electric circuits for said rotors, and current-collecting means bearing on said rotors and supported on said frames.

10. A dynamo-electric machine, comprising, a pair of laterally adjacent frame structures each having two rotor-receiving openings, the openings of different frames being alined with each other, a pair of shafts each occupying a pair of alined openings in different frames and providing a rotor cooperating with said frames, said frames providing magnetic circuits for said rotors, and current-collecting means bearing on said rotors and supported on said frames.

PIERRE I. CHANDEYSSON.